(12) United States Patent
Conrad

(10) Patent No.: US 6,173,474 B1
(45) Date of Patent: *Jan. 16, 2001

(54) CONSTRUCTION OF A VACUUM CLEANER HEAD

(75) Inventor: Wayne Ernest Conrad, Hampton (CA)

(73) Assignee: Fantom Technologies Inc., Welland (CA)

( * ) Notice: Under 35 U.S.C. 154(b), the term of this patent shall be extended for 0 days.

This patent is subject to a terminal disclaimer.

(21) Appl. No.: 09/353,443

(22) Filed: Jul. 14, 1999

Related U.S. Application Data

(63) Continuation-in-part of application No. 09/239,860, filed on Jan. 29, 1999, which is a continuation-in-part of application No. 09/227,534, filed on Jan. 8, 1999.

(51) Int. Cl.[7] .................................................... A47L 9/32
(52) U.S. Cl. ................................................. 15/351; 15/410
(58) Field of Search ............................ 15/347, 350, 351, 15/352, 410

(56) References Cited

U.S. PATENT DOCUMENTS

| | | | |
|---|---|---|---|
| 2,499,330 | * 2/1950 | Reeves ..................................... | 15/350 |
| 2,633,596 | * 4/1953 | Turner et al. ............................ | 15/350 |
| 2,738,538 | * 3/1956 | Vance ...................................... | 15/351 |
| 2,898,621 | 8/1959 | Vance ...................................... | 15/324 |
| 3,061,858 | 11/1962 | Dostal et al. ......................... | 15/340.2 |
| 3,188,681 | * 6/1965 | Jepson et al. ............................ | 15/351 |
| 4,129,920 | 12/1978 | Evans et al. ............................. | 15/337 |
| 4,364,146 | * 12/1982 | Bowerman ............................... | 15/351 |
| 4,621,390 | * 11/1986 | Hampton et al. ........................ | 15/351 |
| 4,670,937 | * 6/1987 | Sumerau et al. ........................ | 15/352 |
| 5,564,160 | * 10/1996 | Luebbering ............................. | 15/351 |
| 5,659,919 | * 8/1997 | Kajihara .................................. | 15/351 |

OTHER PUBLICATIONS

The Cleaning Force of Two Cyclones Devours Dirt, 1999 Fantom Technologies Inc.

* cited by examiner

Primary Examiner—Robert J. Warden, Sr.
Assistant Examiner—Theresa T. Snider
(74) Attorney, Agent, or Firm—Philip C. Mendes da Costa; Bereskin & Parr

(57) ABSTRACT

An upright vacuum cleaner has a vacuum cleaner head for cleaning a floor having a forward portion and two spaced apart rear portions extending rearwardly from the forward portion, the spaced apart rear portions defining an open space there between, and a longitudinally extending upper body portion having a longitudinal axis, the upper body portion being pivotally mounted on the vacuum cleaner head and moveable between a raised position and a lowered position in which the longitudinal axis is generally parallel to the floor, a portion of the upper body portion being received in the open space between the rear portions when in the lowered storage position.

19 Claims, 5 Drawing Sheets

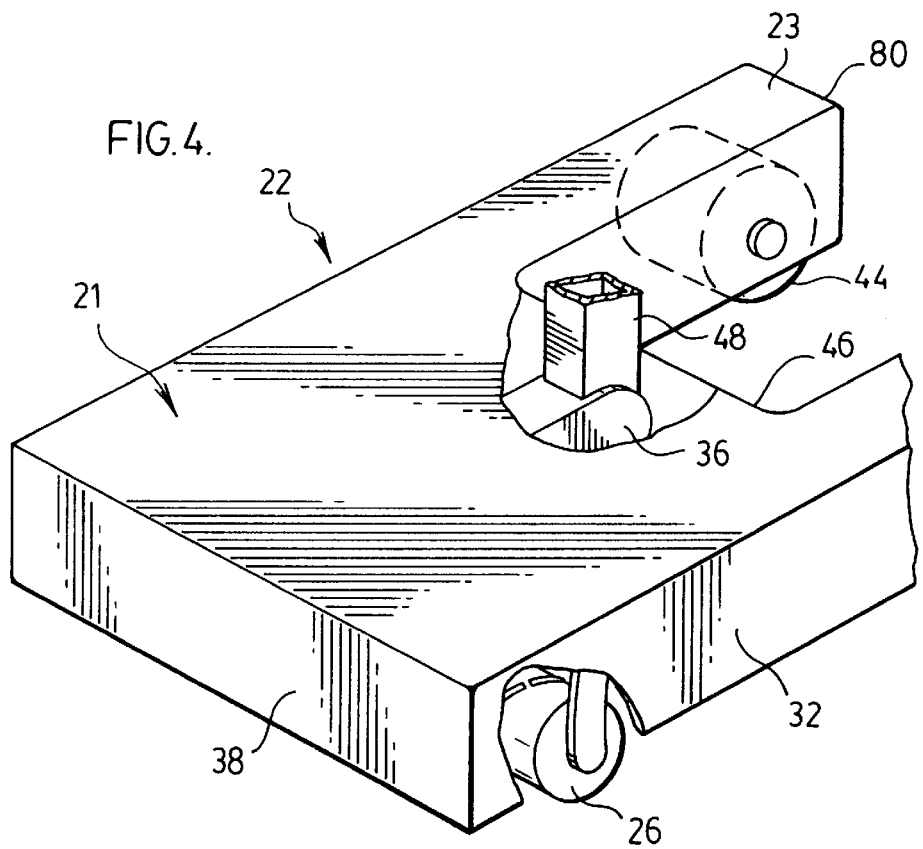
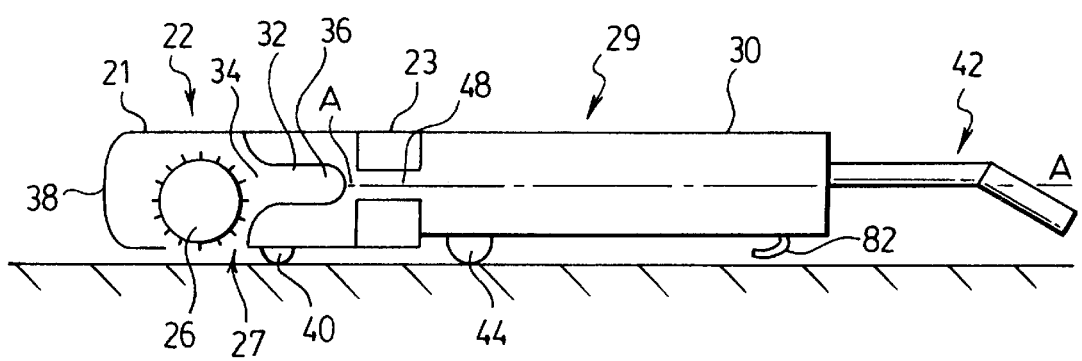

FIG. 5.
FIG. 6.
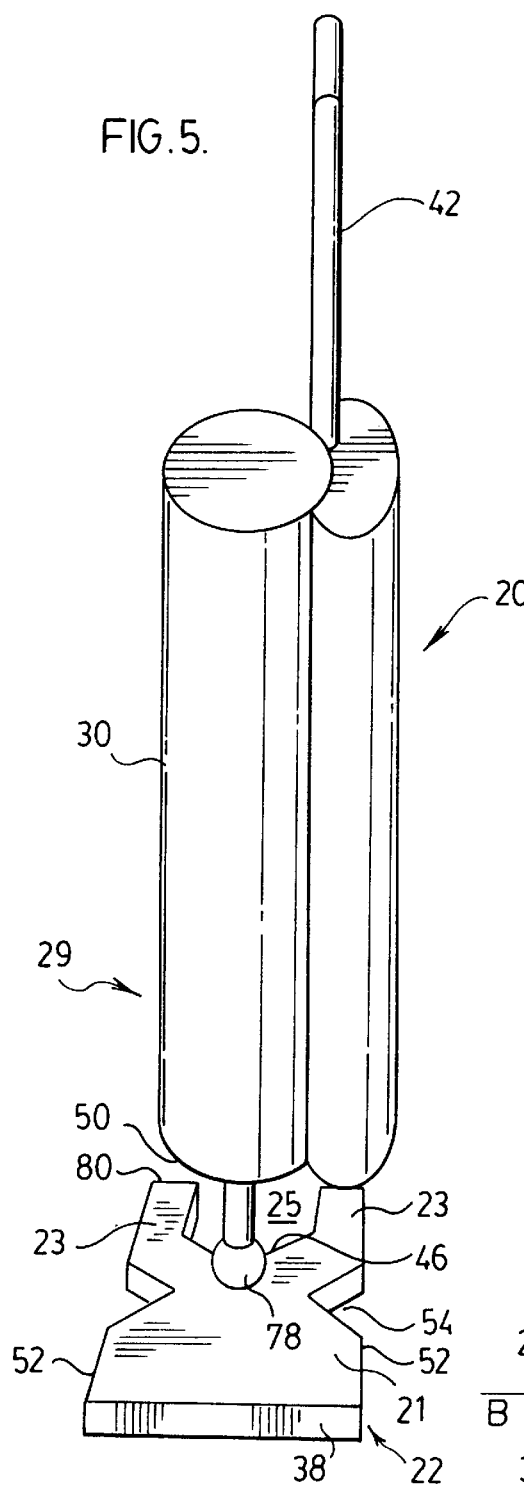
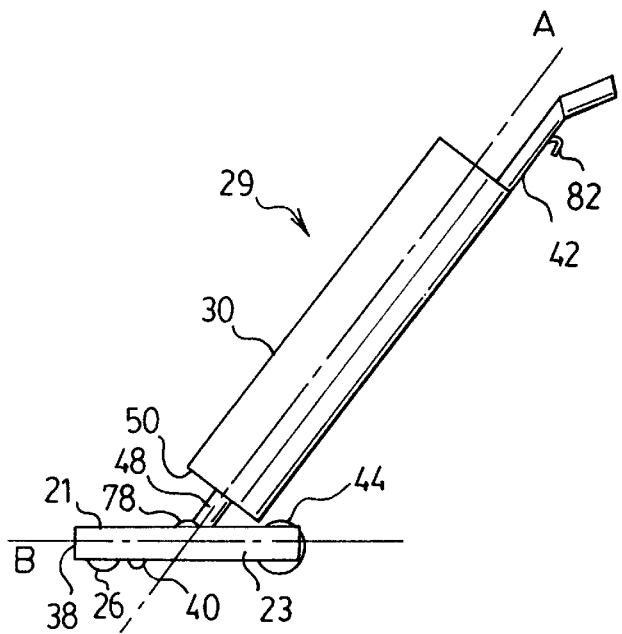

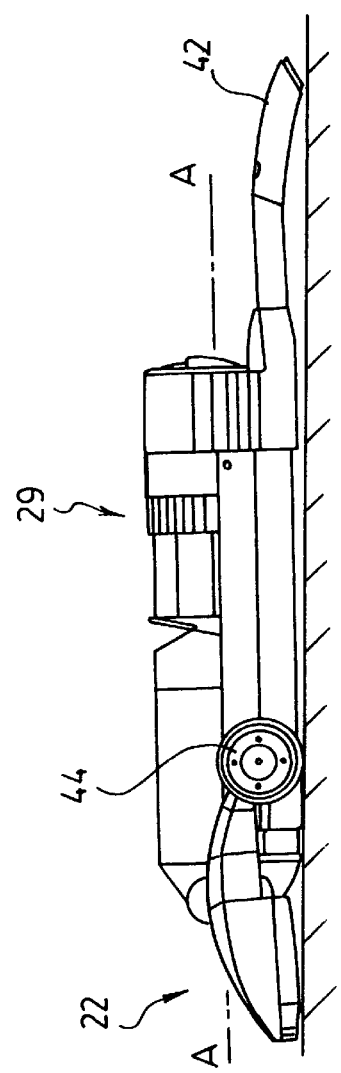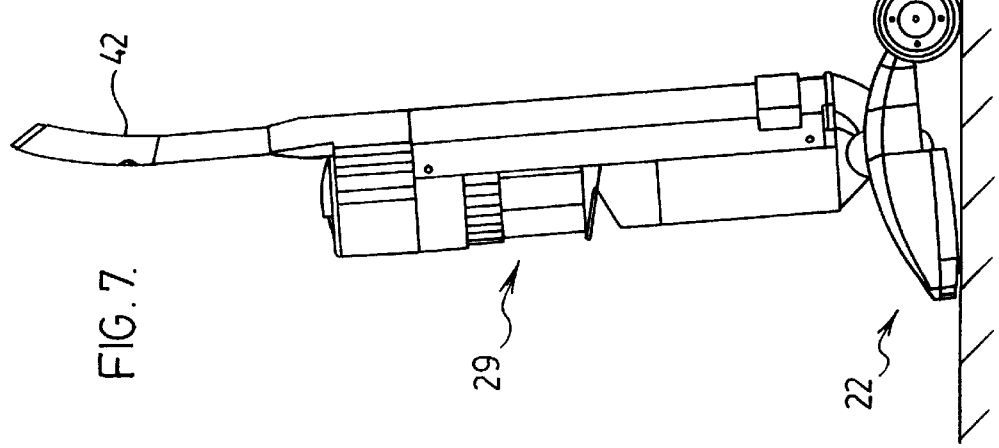

CONSTRUCTION OF A VACUUM CLEANER HEAD

This application is a continuation-in-part of application Ser. No. 09/239,860 filed on Jan. 29, 1999 which is a continuation-in-part of application Ser. No. 09/227,534 filed on Jan. 8, 1999.

FIELD OF THE INVENTION

The present invention relates generally to upright vacuum cleaners.

BACKGROUND OF THE INVENTION

Upright vacuum cleaners typically comprise an upper body portion which is pivotally mounted to a vacuum cleaner head. The upper body portion typically includes a dirt separation mechanism, such as filter bags, cyclones or the like. The vacuum cleaner head comprises a means for entraining dirty air and conveying it to the upper body portion.

Upright vacuum cleaners comprise a large segment of the vacuum cleaner market Unfortunately, they are typically difficult to store. For example, the vacuum cleaner is generally stored with the upper body portion extending generally vertically from the vacuum cleaner head. In this upper storage position, the storage space which is required for the vacuum cleaner comprises the sum of the footprint of the vacuum cleaner as well as the additional space required to accommodate the upper body portion which is positioned at the rear of the vacuum cleaner head.

It has been known to position the rear wheels of the vacuum cleaner on extensions positioned rearward of the upper body portion when the upper body portion is in the upright position. Examples of these include U.S. Pat. No. 4,129,920 (Evans et al.) and the U.S. Pat. No. 2,898,621 (Vance). In these cases, the wheels are so positioned as to prevent the vacuum cleaner from being able to lie in a generally flat position.

SUMMARY OF THE INVENTION

In order to overcome these limitations, in accordance with the instant invention, a vacuum cleaner head having a novel configuration is provided. The vacuum cleaner head has rear wheel mounts which are spaced apart a sufficient amount so as to allow the upper body portion of an upright vacuum cleaner to be positioned there between so as to enable the vacuum cleaner to lie flat. Thus, the vacuum cleaner has a very low profile and may be able to be stored, for example, under a bed. Further, by enabling the upper body portion to extend directly behind the vacuum cleaner head, the vacuum cleaner may be hung in a closet or the like with a minimum of storage space being occupied by the vacuum cleaner.

In accordance with the instant invention, there is provided an upright vacuum cleaner comprising a vacuum cleaner head for cleaning a floor having a forward portion and two spaced apart rear portions extending rearwardly from the forward portion, the spaced apart rear portions defining an open space there between, and a longitudinally extending upper body portion having a longitudinal axis, the upper body portion being pivotally mounted on the vacuum cleaner head and moveable between a raised position and a lowered position in which the longitudinal axis is generally parallel to the floor, a portion of the upper body portion being received in the open space between the rear portions when in the lowered storage position.

In accordance with the instant invention, there is also provided a vacuum cleaner head adapted for connection to a longitudinally extending upper body portion defining an upper body axis, the vacuum cleaner head comprising a main portion defining a vacuum cleaner head axis, rear wheel mount portions positioned rearward of the main portion and a passage for receiving the upper body portion, and a pivot member for pivotally mounting the upper body portion to the vacuum cleaner head for movement of the upper body portion between a raised position in which the upper body axis is at an angle to the vacuum cleaner head axis and a lowered storage position in which the upper body axis and the vacuum cleaner head axis are substantially parallel.

In one embodiment, the upper body portion is pivotally mounted on the vacuum cleaner head at a position forward of the spaced apart rear portions.

In another embodiment, the upper body portion includes a dirt separation member and a handle.

In another embodiment, the forward portion has a rearward surface and the rear portions extend rearwardly of rearward surface.

In another embodiment, each rear portion has a rearward end and rear wheels are positioned adjacent the rearward end of the rear portions.

In another embodiment, the vacuum cleaner head further comprises a front and spaced apart lateral sides extending longitudinally from the front towards the rear portions and the rear portions extend rearwardly from a position adjacent the lateral sides.

In another embodiment, a portion of the upper body portion is positioned between the rear wheels when the upper body portion is positioned in the lowered storage position. In such a case, the upper body portion may comprises an upper casing and a support member with the support member extending between the upper casing and the cleaning head and pivotally mounted to the cleaning head. The rear portions and the support member may be sized so that a portion of the upper casing is positioned between the rear wheels when the upper body portion is positioned in the lowered storage position. Alternately, the rear portions and the support member may be sized so that a portion of the upper member (and not the upper casing) is positioned between the rear wheels when the upper body portion is positioned in the lowered storage position.

In another embodiment, the pivot member is mounted on the vacuum cleaner head at a position forward of the rear wheel mount portions.

In another embodiment, the upper body portion includes a dirt separation member and a handle and the passage is sized to receive therein a portion of the upper body portion including the dirt separation member.

In another embodiment, the rear wheel mount portions are positioned on either side of the passage.

In another embodiment, the vacuum cleaner head further comprises a front and spaced apart lateral sides extending longitudinally from the front towards the rear wheel mount portions and the rear wheel mount portions extend rearwardly from a position adjacent the lateral sides.

In accordance with another embodiment of the instant invention, there is provided a vacuum cleaner head adapted for connection to a longitudinally extending upper body portion defining an upper body axis, the vacuum cleaner head comprising a main portion defining a vacuum cleaner head axis, rear wheel mount means positioned rearward of the main portion and storage means extending in the direction of the vacuum cleaner head axis for receiving the upper body portion, and pivot means for pivotally mounting the upper body portion to the vacuum cleaner head for movement of the upper body portion between a raised position in which the upper body axis is at an angle to the vacuum cleaner head axis and a lowered storage position in which the upper body portion is received in the storage means.

In another embodiment, the pivot means is mounted on the vacuum cleaner head at a position forward of the rear wheel mount means.

In another embodiment, the upper body portion includes a dirt separation member and the storage means is sized to receive therein a portion of the upper body portion including the dirt separation member.

In another embodiment, the rear wheel mount means are positioned on either side of the storage means. Each rear wheel mount means may have a rearward end and rear wheels are positioned adjacent the rearward end of rear wheel mount means.

BRIEF DESCRIPTION OF THE DRAWINGS

For a better understanding of the present invention, and to show more clearly how it may be carried into effect, reference will now be made by way of example to the accompanying drawings which show a preferred embodiment of the present invention, in which:

FIG. 3 is a cross-section along line 3—3 in FIG. 2 of the upright cyclonic vacuum cleaner of FIG. 1;

FIG. 4 is an enlarged partially cut away view of the vacuum cleaner head of FIG. 1;

FIG. 5 is a perspective view of an alternate embodiment of an upright vacuum cleaner with the upper body portion in an upright storage position;

FIG. 6 is a side elevational view of the vacuum cleaner of FIG. 5 in a lowered in use position;

FIG. 7 is a perspective view of a further alternate embodiment of an upright vacuum cleaner with the upper casing in an upright storage position;

FIG. 8 is a perspective view of the vacuum cleaner shown in FIG. 7 with the upper casing in a lowered vacuuming/storage position; and, FIG. 9 is a top plan view of the vacuum cleaner shown in FIG. 7 with the upper casing in an upright storage position.

DETAILED DESCRIPTION OF THE PREFERRED EMBODIMENT

An upright cyclonic vacuum 20 according to the present invention comprises a vacuum cleaner head 22 which is provided at the lower end of upper body portion 29.

Figure 1:
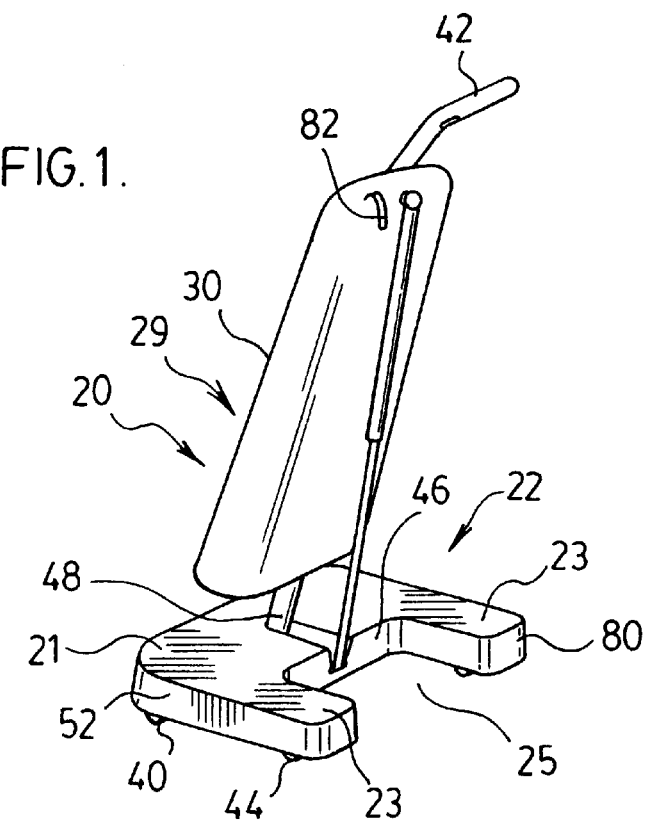
FIG. 1 is a perspective view of an upright vacuum cleaner with the upper casing in an upright storage position.

This invention relates to the configuration of vacuum cleaner head 22. Accordingly, vacuum cleaner head 22 and upper body portion 29 may each include any mechanism known in the vacuum cleaner art. For example, vacuum cleaner head 22 may be provided with a transversely extending, floor-contacting rotating brush member 26 which is mounted for rotation in head 22 above dirty air inlet 27. Means for enabling vacuum cleaner head 22 to be moved over the surface to be cleaned are also preferably provided. These may be glides or wheels. As shown in FIG. 1, front wheels 40 and rear wheels 44 are provided.

Similarly, upper body portion 29 may include any dirt separation member known in the vacuum cleaner art. For example, upper body portion 29 may use one or more physical filters, such as a vacuum cleaner bag or one or more cyclones for dirt separation. A handle 42 may also be provided. It will be appreciated that dirt separation means may be provided in vacuum cleaner head 22.

The vacuum cleaner also includes a motor for producing air flow through vacuum cleaner head 22. The motor may be positioned anywhere such as in vacuum cleaner head 22 or in upper body portion 29 as is known in the art. Preferably, the motor is positioned in upper body portion 29.

Figure 9:
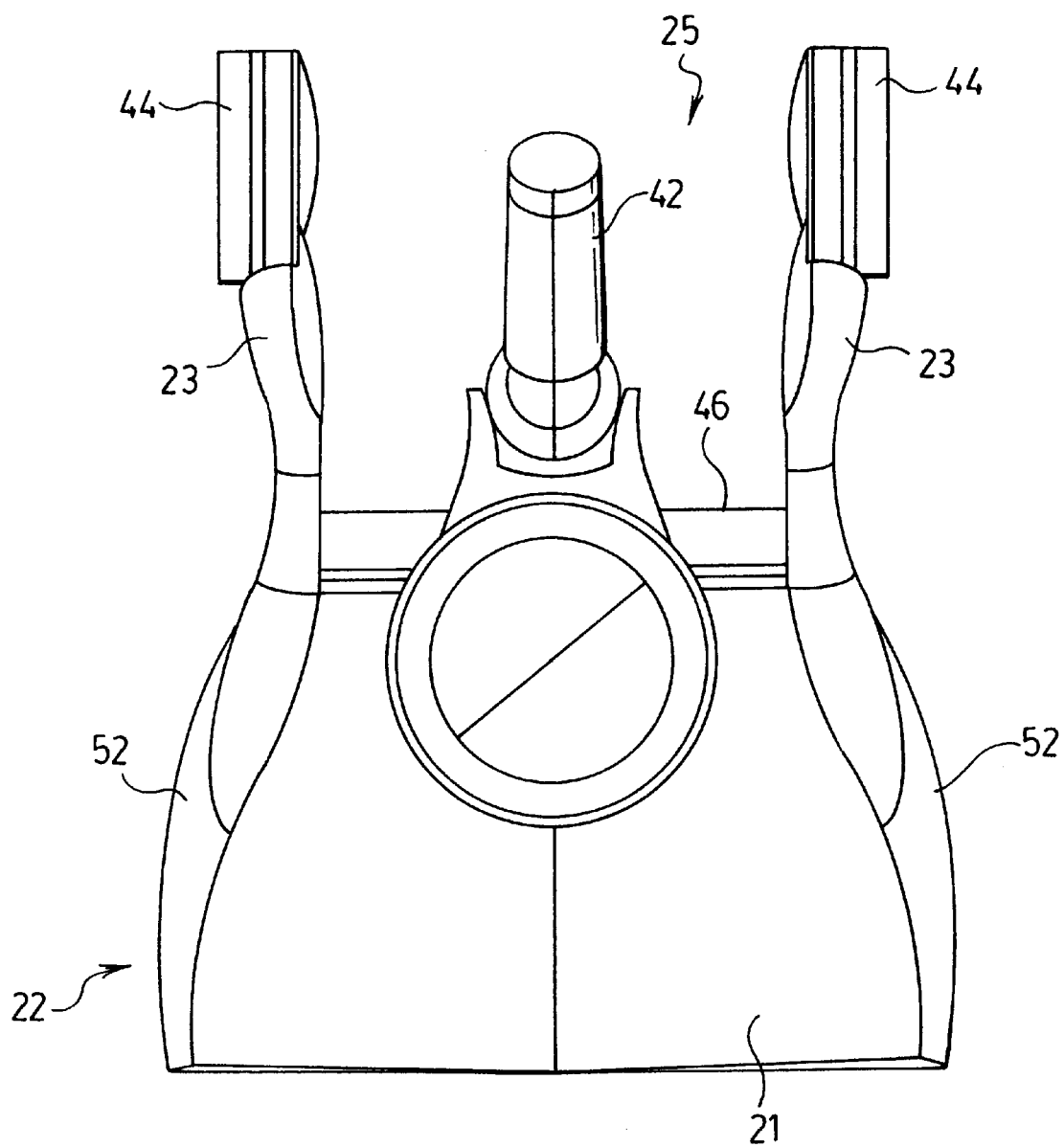

Upper body portion may comprise an upper casing 30 positioned above a support member 48. Support member 48 may connect upper casing 30 in air flow communication with vacuum cleaner head 22. Alternately, as shown in FIGS. 7–9, upper body portion 29 may be itself pivotally connected to vacuum cleaner head 22.

In operation, the vacuum fan motor is activated to induce an air flow through cleaner 20. The air flow causes a partial vacuum to form at dirty air inlet 27. Air, and entrained dirt, is drawn into air inlet conduit 32 with the aid of brush member 26. The dirty air flow moves upwardly through support member 48 to upper casing 30 for dirt separation.

In order to be able to convert the vacuum cleaner for above the floor cleaning, handle 42 may be hollow and be connected to a flexible hose (not shown) for connecting handle 42 in air flow communication with the dirt separation member. In the off the floor cleaning mode (i.e. in a canister mode), handle 42 may be in air flow communication with support member 48 by a flexible hose. Suitable valving means known in the art may be incorporated to selectively connect in air flow communication dirty air inlet 27 and handle 42 with the dirt separation member.

Upper body portion 29 is preferably pivotally mounted to head 22. Any pivot means known in the art may be used. For example, as shown in FIGS. 3 and 4, vacuum cleaner head 22 may have an air inlet conduit 32 in air flow communication with dirty air inlet 27. Air inlet conduit 32 has an entrance end 34 and an exit end 36. Support member 48 is pivotally mounted to exit end 36. Alternately, as shown in FIGS. 5 and 6, support member 48 may be pivotally mounted to vacuum cleaner head 22 by ball joint 78.

With this pivot mount, upper body portion 29 may be positionable in an upright storage position as shown in FIGS. 1 and 5 wherein upper body portion 29 extends generally vertically upwardly from head 22. Upper body portion 29 may be lockingly positioned in this position by a locking means as is known in the art. Upper body portion 29 may then be rotated downwardly to an in use position as shown in FIG. 6 wherein a user may move the vacuum cleaner over a surface to be cleaned.

Figure 2:
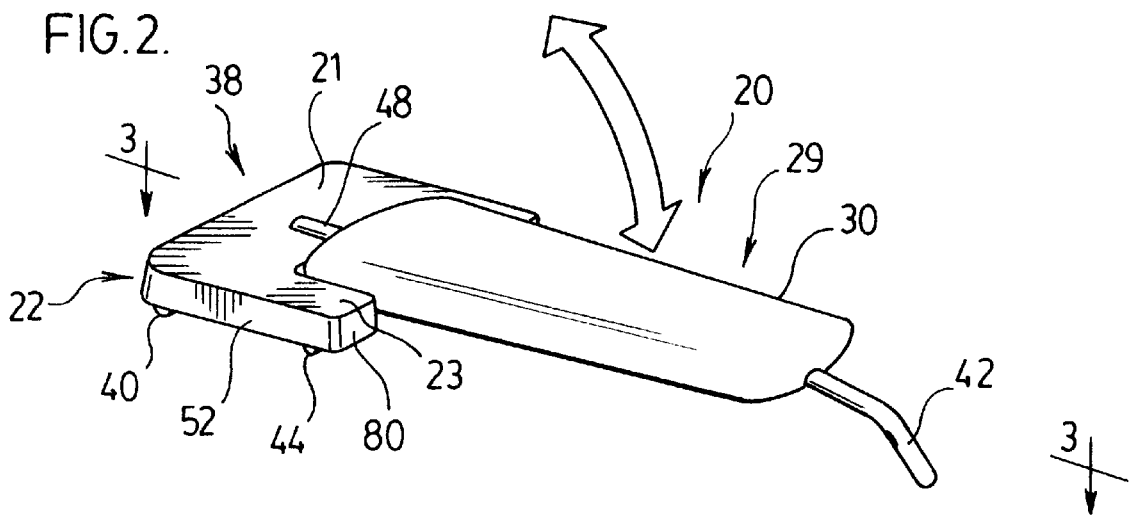
FIG. 2 is a perspective view of the vacuum cleaner shown in FIG. 1 with the upper casing in a lowered vacuuming/storage position.

Upper body portion 29 may also be moved to a lowered position as shown in FIGS. 2, 3 and 8 wherein vacuum cleaner head 22 and upper body portion 29 extend generally in a straight line. In this position, main body portion 29 has a central axis A that is generally parallel to the floor on which the vacuum cleaner is positioned. With this profile, vacuum cleaner 20 may be easily placed under many beds and like pieces of furniture which have a low clearance for storage or cleaning. Further, vacuum cleaner 20 may be hung vertically for storage (i.e. in the configuration of the lowered position of FIGS. 2, 3 and 8) such as from a hook mounted in a wall or from a ceiling by means of hanger 82 using any hanger means known in the art. Hanger 82 may be provided on upper body portion 29 (see FIGS. 1 and 3) or on handle 42 (see FIG. 6). Hanger 82 may be of any shape that will allow vacuum cleaner 20 to be hung up.

Head 22 may comprise a forward portion 21 and two rear portions 23 extending rearwardly from the forward portion 21. Forward portion 21 may comprise the main portion of the vacuum cleaner head and preferably includes the mechanical components of the vacuum cleaner head (eg. dirty air inlet 27 which is preferably positioned adjacent the front end 38 of vacuum cleaner head 22, brush 26 and air inlet conduit 32). Rear portion 23 may comprise the rear wheel mounts which are spaced apart and define a space 25 there between. Space 25 defines a passage for receiving a portion of upper body portion 29 when in the lowered position. Preferably, space 25 has a sufficient length so as to allow a portion of upper body portion 29 which includes a portion of the dirt separation means to fit there within.

In the lowered position, upper body portion 29 extends generally rearwardly from front portion 21 of head 22 and fits in space 25 so as to allow the vacuum cleaner to lie effectively flat. Preferably, space 25 has a sufficient width so as to allow upper body portion 29 to fit there within so that vacuum cleaner head axis B is generally parallel to main body axis A of upper body portion 29 (eg., axis A may be at an angle of 5–10° to axis B). More preferably, longitudinal axis A and B define a continuous axis when upper body portion 29 is the lowered storage position (i.e., axis A is at an angle of 0° to axis B).

In a particular preferred embodiment, space 25 has a sufficient width to accommodate therein the lower portion of upper casing 30. Thus rear portions extend on either side of upper casing 30 when upper body portion 29 is in the lowered storage position (see FIG. 3). However, if support member 48 is sufficiently long, upper casing 30 may be positionable in the lowered storage position such that bottom 50 is spaced from rearward ends 80 of rear portions 23.

It will be appreciated that upper body portion 29 is preferably pivotally mounted to vacuum cleaner head 22 at a position forward of rearward surface 46 of main portion 21. More preferably, the pivot mount is positioned between brush 26 and rearward surface 46.

Referring to FIGS. 1 and 5, it will be noted that even within the scope of this invention, the configuration of vacuum cleaner head and upper body portion 29 may vary. For example, as shown in FIG. 1, lateral opposed sides 52 extend longitudinally from front 38 to rearward end 80 of rear wheel mounts 23. In this embodiment, lateral sides 52 are parallel and continuous throughout their entire length. Referring to FIG. 5, it will be seen that lateral sides 52 extend rearwardly towards rear wheel mounts 23. Mounts 23 are discontinuous at inset portion 54. In either case, rear wheel mounts 23 are spaced apart so as to define a passage or a space 25 for permitting the vacuum cleaner to essentially lie flat. Similarly, it can be seen that the configuration of upper body portion 29 may vary. As shown in FIG. 1, upper body portion comprises a longitudinally extending generally elliptical member whereas in FIG. 5, upper body portion 29 has an upper casing which is generally circular with a crescent shaped member provided therewith. In either case, rear wheel mounts 23 define a passage having the sufficient width so as to permit the vacuum cleaner to lie flat. As shown in FIG. 9, upper body portion 29 is generally cylindrical.

While the above description constitutes the preferred embodiments, it will be appreciated that the present invention is susceptible to modification and change without departing from the fair meaning of the proper scope of the accompanying claims.

What is claimed is:

1. An upright vacuum cleaner comprising:
   (a) a vacuum cleaner head for cleaning a floor having a dirty air inlet, an air flow passageway positioned downstream from the dirty air inlet and connectable to a source of suction, a forward portion and two spaced apart rear portions extending rearwardly from the forward portion, the spaced apart rear portions defining an open space there between; and,
   (b) a longitudinally extending upper body portion having a longitudinal axis, the upper body portion being pivotally mounted on the vacuum cleaner head and moveable between a raised position and a lowered position in which the longitudinal axis is generally parallel to the floor, a portion of the upper body portion being received in the open space between the rear portions when in the lowered storage position, the upper body portion is pivotally mounted on the vacuum cleaner head at a position forward of the spaced apart rear portions.

2. The upright vacuum cleaner as claimed in claim 1 wherein the upper body portion includes a dirt separation member and a handle.

3. The upright vacuum cleaner as claimed in claim 1 wherein the forward portion has a rearward surface and the rear portions extend rearwardly of rearward surface.

4. The upright vacuum cleaner as claimed in claim 1 further comprising front wheels positioned on the forward portion and rear wheels positioned on the rear portions.

5. The upright vacuum cleaner as claimed in claim 4 wherein each rear portion has a rearward end and rear wheels are positioned adjacent the rearward end of rear portions.

6. The upright vacuum cleaner as claimed in claim 1 wherein the head further comprises a front and spaced apart lateral sides extending longitudinally from the front towards the rear portions and the rear portions extend rearwardly from a position adjacent the lateral sides.

7. The upright vacuum cleaner as claimed in claim 1 wherein the head further comprises rear wheels and the upper body portion has dirt separation means and a portion of the upper body portion containing a portion of the dirt separation means is positioned forward of the rear wheels when the upper body portion is positioned in the lowered storage position.

8. The upright vacuum cleaner as claimed in claim 1 further comprising a biasing member engaging the vacuum cleaner head and the upper body portion to bias the upper body portion to the raised position.

9. A vacuum cleaner head adapted for connection to a longitudinally extending upper body portion defining an upper body axis, a dirty air inlet and an air flow passageway positioned downstream from the dirty air inlet and connectable to a source of suction, the vacuum cleaner head comprising:
   (a) a main portion defining a vacuum cleaner head axis, rear wheel mount portions positioned rearward of the main portion and a passage for receiving the upper body portion; and,
   (b) a pivot member for pivotally mounting the upper body portion to the vacuum cleaner head for movement of the upper body portion between a raised position in which the upper body axis is at an angle to the vacuum cleaner head axis and a lowered storage position in which the upper body axis and the vacuum cleaner head axis are substantially parallel, the pivot member is mounted on the vacuum cleaner head at a position forward of the rear wheel mount portions.

10. The vacuum cleaner head as claimed in claim 9 wherein the upper body portion includes a dirt separation member and a handle and the passage is sized to receive therein a portion of the upper body portion including the dirt separation member.

11. The vacuum cleaner head as claimed in claim 9 wherein the rear wheel mount portions are positioned on either side of the passage.

12. The vacuum cleaner head as claimed in claim 11 wherein each rear wheel mount portion has a rearward end and rear wheels are positioned adjacent the rearward end of rear wheel mount portions.

13. The vacuum cleaner head as claimed in claim 9 further comprises a front and spaced apart lateral sides extending longitudinally from the front towards the rear wheel mount portions and the rear wheel mount portions extend rearwardly from a position adjacent the lateral sides.

14. The vacuum cleaner head as claimed in claim 9 further comprising a biasing member engagable to the upper body portion to bias the upper body portion to the raised position when the upper body portion is connected to the vacuum cleaner head.

15. A vacuum cleaner head adapted for connection to a longitudinally extending upper body portion defining an upper body axis, a dirty air inlet and an air flow passageway positioned downstream from the dirty air inlet and connectable to a source of suction, the vacuum cleaner head comprising:

(a) a main portion defining a vacuum cleaner head axis, rear wheel mount means positioned rearward of the main portion and storage means extending in the direction of the vacuum cleaner head axis for receiving the upper body portion; and, (b) pivot means for pivotally mounting the upper body portion to the vacuum cleaner head for movement of the upper body portion between a raised position in which the upper body axis is at an angle to the vacuum cleaner head axis and a lowered storage position in which the upper body portion is received in the storage means, the pivot means is mounted on the vacuum cleaner head at a position forward of the rear wheel mount means.

16. The vacuum cleaner head as claimed in claim 15 wherein the upper body portion includes a dirt separation member and the storage means is sized to receive therein a portion of the upper body portion including the dirt separation member.

17. The vacuum cleaner head as claimed in claim 15 wherein the rear wheel mount means are positioned on either side of the storage means.

18. The vacuum cleaner head as claimed in claim 17 wherein each rear wheel mount means has a rearward end and rear wheels are positioned adjacent the rearward end of rear wheel mount means.

19. The vacuum cleaner head as claimed in claim 15 further comprising biasing means for biasing the upper body portion to the raised position when the upper body portion is connected to the vacuum cleaner head.

* * * * *